United States Patent Office 3,743,488
Patented July 3, 1973

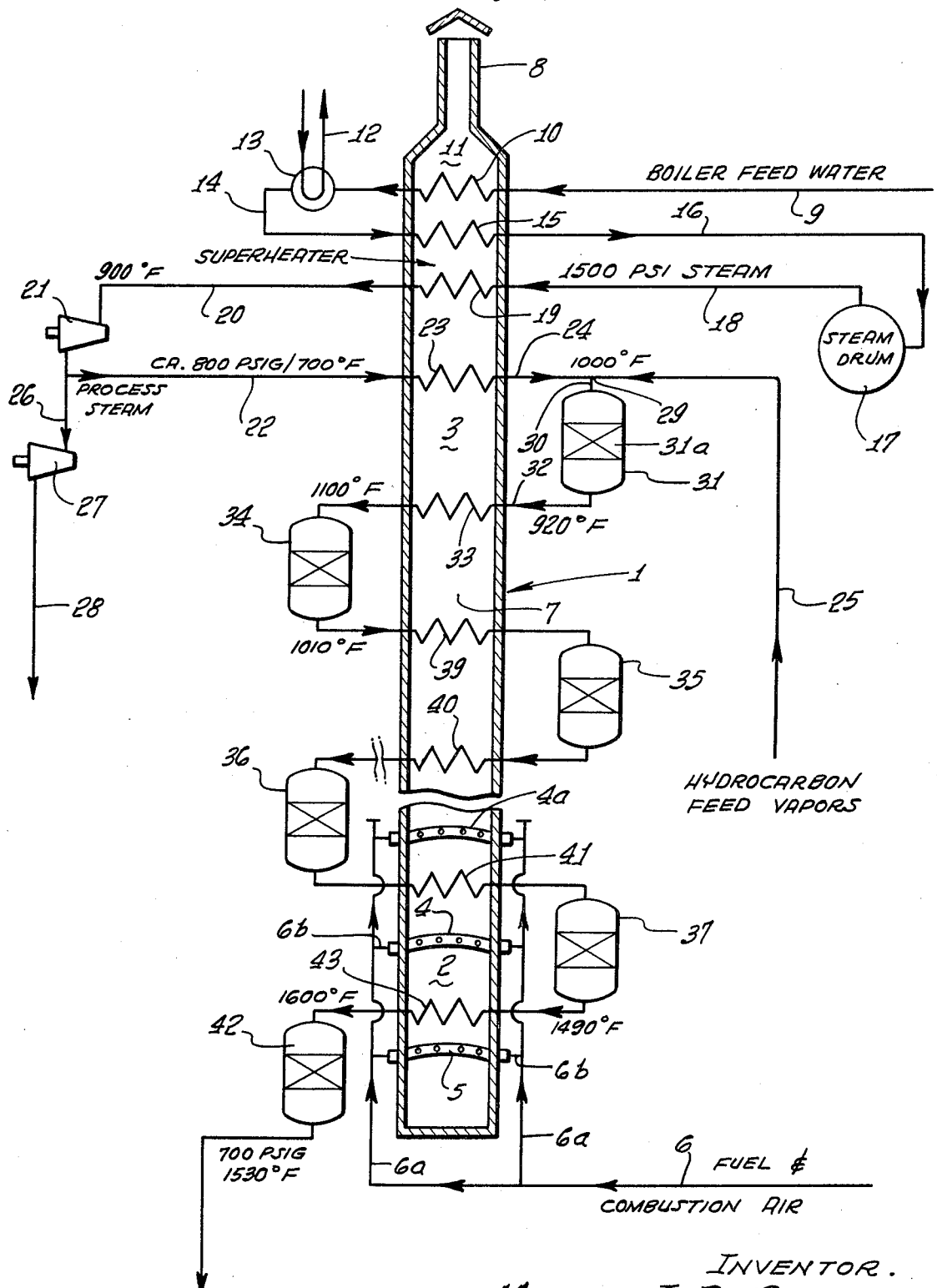

3,743,488
SYNTHESIS GAS GENERATION PROCESS
Marcel J. P. Bogart, Whittier, Calif., assignor to Fluor Corporation, Los Angeles, Calif.
Filed May 27, 1971, Ser. No. 147,379
Int. Cl. C01b 2/14
U.S. Cl. 48—214         15 Claims

ABSTRACT OF THE DISCLOSURE

Process for generating high pressure synthesis gas containing CO and $H_2$ and useful in Oxo processes, hydrogen production, and in the production of ammonia, methanol and the like. The reaction mixture of steam and hydrocarbon vapor is heated out of contact with the reaction catalyst and adiabatically reacted in a separated reaction zone and alternately reheated and further reacted as required to substantially exhaust the reaction mixture of hydrocarbon vapor. Separation of the heating and catalytic reacting steps overcomes previously encountered equipment-imposed limitations on high pressures within the reaction apparatus at reforming temperatures and thus enables higher pressure output synthesis gas. Significant fuel economies are realized through the use of convection heat to effect the lower temperature portion of the reforming reaction.

BACKGROUND OF THE INVENTION

This invention has to do with synthesis gas generation and, more particularly, is concerned with a process enabling the obtainment of synthesis gas at higher pressures than heretofore possible, with increased heat utilization efficiencies and reduced compression energy consumption, and thus at lower overall cost.

Synthesis gas is a term applied to raw material gas streams containing hydrogen and carbon oxides which may be converted, "synthesized," into products for which there is considerable commercial demand, e.g. methanol, hydrogen, ammonia and Oxo process products. A basic route to suitable synthesis gases is the steam reforming of hydrocarbon vapors which form a readily available and low cost source of hydrogen and carbon. In steam reforming, a reaction mixture of steam and hydrocarbon vapor, ranging from methane to naphtha and higher molecular weight hydrocarbons, is contacted at high temperatures, 1000° F. and above, and at elevated pressures, with a suitable catalyst. The catalytic reaction with the steam converts the hydrocarbon raw material into hydrogen and carbon oxides. The basic reactions taking place include:

(1) 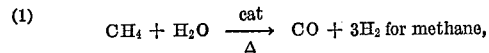

and (2) 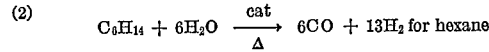

and similarly for other hydrocarbon vapors. The CO and $H_2O$ may react to form $CO_2$ and additional $H_2$ by the so-called water-gas shift reaction.

(3)     $CO + H_2O \rightarrow CO_2 + H_2$

An excess of steam ($H_2O$), over the stoichiometric amount indicated in the Equations 1 and 2 above, is typically employed to force the equilibrium in the reforming reactions toward the right hand side of Equations 1 and 2. Such stoichiometric excess of steam will also maximize conversion of carbon monoxide by the shift reaction, Equation 3. Should a deficiency in CO thus develop, e.g. for a synthesis gas to be used in methanol production according to the equation.

(4)     $CO + 2H_2 \rightarrow CH_3OH$ there may be added $CO_2$ to the reaction mixture for the generation in the reforming process of CO, as by overall equation (5)     $CO_2 + 3CH_4 + 2H_2O \rightarrow 4(CO + 2H_2)$ In producing the above-mentioned commercially important products and others, the generated synthesis gas leaving the steam reforming process is subjected to further treatments, e.g. Equation 4 above. Such treatments frequently desirably or necessarily involve the use of quite high pressure, e.g. 500 p.s.i.g. and even considerably higher pressures in the range of 1500 p.s.i.g. to 10,000 p.s.i.g.

Raw synthesis gas obtained from the reformer at lower pressures thus must be compressed to desirable further treatment pressures necessitating high energy costs and capital expense for the compression.

PRIOR ART

To my knowledge, synthesis gases containing hydrogen and carbon oxides at higher pressures than 400–500 p.s.i.g. are not economically obtainable in heretofore known steam reformers. The limitation on pressures obtainable is inherent in the design of presently known catalytic reforming reactors, given the present state of construction material development.

In presently used steam reforming processes, a plurality of catalyst filled tubes, vertically disposed within a furnace, are used as the reaction zone. The tubes are located specifically inside the firebox or radiant heating section of the furnace and are there subjected to radiant heat from a surrounding multiplicity of burners burning a suitable fuel and arranged to give a high uniformity of heat distribution. The catalyst supporting tubes necessarily are formed of high heat resistant alloy material. These tubes may be 20 to 40 feet in length, have inside diameters of 3 to 5 inches, and a wall thickness of 0.5 to 0.75 inch and more. The tubes are filled throughout their length with reforming catalyst of well known and conventional composition, typically in the form of hollow cylinders 0.37 inch in outside diameter and 0.37 inch in length. Being located in the radiant heating section of the furnace, these catalyst containing tubes are heated to a substantial temperature by the burner flames. For example, in generation of an ammonia synthesis gas, a steam-hydrocarbon vapor mixture preheated to e.g. 900° F. enters the catalyst tubes and must be heated to over 1400° F. in the course of passage through the tubes requiring the furnace combustion gases to reach temperatures of 1900° F. and more.

The catalyst containing tubes are subject to maximum heat stress at their outer wall near the bottom of the firebox. Temperatures on the outer tube skin will likely be 150° F. to 200° F. higher than the exit temperature of the treated reaction mixture, e.g. 1600° F. and higher. Such temperatures are in the critical region for the tube metal, where the allowable design stress of the alloys available drops off sharply. For example, a 304 stainless alloy undergoes a loss of strength from 2,500 p.s.i. at 1600° F. to 1,200 p.s.i. at 1800° F. and to only 500 p.s.i. at 2000° F.

The suitable wall thickness of a catalyst carrying tube for a reformer is given by the formula $$t = \frac{PD}{fS}$$

wherein P is the operating pressure, D, the tube diameter, S, the allowable stress and $f$ a design safety factor. The economical upper limit of wall thickness for reformer tubes is about one inch. The typical tube dimensions and maximum heated gas temperature mentioned above combine to limit the allowable internal gas pressure within these tubes to about 500 p.s.i.g. for presently commercially employed and foreseeable alloys.

Modifications of tube design such as reduction of diameter D could raise the allowable pressure limit without an increase in wall thickness $t$. Because the tube is used to contain a catalyst bed, fluid flow and heat and mass transfer characteristics are significant and a reduced tube diameter would necessitate a corresponding decrease in catalyst particle size. The use of smaller catalyst pellets would, however, require a reduction in reaction mixture velocity through the tubes to keep the gas pressure drop through the tube at an acceptably low level. This change would require a markedly increased number of tubular elements at greatly increased cost for the radiant section of the reformer.

Moreover, the increase in gas volume as Reactions 1 and 2 proceed requires raising of the final temperature as the operating pressure goes up to maintain levels of unconverted hydrocarbon, "methane leak," reasonably constant and near the thermodynamic equilibrium value. According to the above tube wall thickness formula, the tube wall thickness could be cumulatively increased by the dual effect of the raised pressure and the further dropping of the already low value of allowable stress by the increase in operating temperature.

A further significant aspect of present reforming processes is undue waste in heat utilization. As noted above in previously known reformers the burner tubes are located in the firebox or radiant heating section of the furnace. Combustion gases used to heat the reactor tubes leave the radiant section of the furnace at temperatures above 1900° F., i.e. with tremendous heat contents which are not useable to further the reforming reaction. Cooling these flue gases to say 500 F. or less for the sake of economic heat utilization before venting them to the atmosphere will provide a quantity of surplus heat approximately as great as all the heat used to effect the reforming reaction. Thus the minimum fired duty for a known reformer furnace is nearly double that duty required to satisfy the reforming reaction. Economy of operation dictates that a use must be found elsewhere in the process or plant for about one-half of the fired duty of the conventional reformer furnace; such uses include preheating air for the secondary reformer, if used and generation and superheating of process and motive steam. Obviously, a closer tailoring of furnace fired duty to reforming reaction requirements could mean significant fuel savings over conventional processes.

SUMMARY OF THE INVENTION

It is a major objective of the present invention to provide process for obtaining high pressure synthesis gas from a conventional reformer reaction mixture by satisfying the high endothermic heat requirements of the process in a novel manner freeing the catalyst containing vessel from exposure to firebox level temperatures while retaining high reaction mixture temperatures needed for efficient conversion of the reaction mixture into synthesis gas.

It is a further objective of the invention to have the minimum fired duty of the furnace more closely approximate reforming reaction heat requirements, whereby substantial fuel savings are realized.

Specifically there may be mentioned these advantages of the present invention process:

The generated synthesis gas is delivered at high pressures lowering compression requirements for further treatment operations;

The catalyst containing vessel is widely variable in design and in materials of fabrication;

The radiant heating and convection heating sections of the furnace are each used to advantage because the endothermic heat of reforming does not have to be transferred entirely within the radiant section of the furnace;

The catalyst beds may be tailored both chemically and physically, for maximum effect in particular reactions, in sequence, as the reaction mixture composition changes, or for specific effects;

Catalyst life may be improved by specific adaptation and its cost lowered initially and during operation; capital costs are reduced by the elimination of dual demands for simultaneously high pressure and very high temperature resistance in the reaction vessel wall.

Other objects will become apparent hereinafter.

BRIEF DESCRIPTION OF THE DRAWINGS

The invention will be described as to an illustrative embodiment in accordance with the attached drawing in which the single figure is a schematic flow sheet depiction of one form of apparatus for carrying out the present process.

DESCRIPTION OF THE PREFERRED EMBODIMENTS

According to the present process the heating and reacting stages essential to generation of synthesis gas containing carbon oxides and hydrogen from steam and hydrocarbon vapor are separated and the catalyst containing reactor vessels removed from the heating zone so that the high temperatures there present are not visited unduly upon the reactor vessels. The reaction is conducted adiabatically, i.e. without the input of heat into the reactor other than by preheating the feed to the reactor. This process accordingly reduces substantially heat stresses in the reactor vessels, and thus enables wide variability in their design and most importantly frees the synthesis gas generation process from artificial constraints on pressures usable, to enable obtaining of higher pressure synthesis gas. The preheating of the reactor feed gases may be done in small-diameter thin-wall tubes, reducing their outer skin temperatures and allowing their operation at higher internal pressures.

In particular, the invention provides in the process of generating high pressure synthesis gas containing hydrogen and carbon oxides from a reaction mixture comprising steam and hydrocarbon vapor by contacting the mixture at reaction temperature with a catalytically effective amount of a solid catalyst, the steps including, in sequence (1) heating the reaction mixture in a heating zone out of contact with the catalyst to reaction temperature, (2) at a pressure above 150 p.s.i.g. adiabatically reacting the heated reaction mixture in a reaction zone containing the catalyst separate from the heating zone to form a synthesis gas containing effluent, (3) repeating steps (1) and (2) with successive reaction zone effluents as the reaction mixture until the hydrocarbon vapor therein is substantially exhausted, and (4) recovering the synthesis gas thus generated and at a pressure above 150 p.s.i.g. The successive reaction steps may be effected in separate reaction zones and the successive heating steps in successive heating zones and in alternating sequence while all heating zones may be heated from a common source. The process further includes in preferred embodiment maintaining a pressure above 700 p.s.i.g. on the reaction mixture during the several steps, and also maintaining a temperature above about 750° F. The reaction mixture may be heated to successively higher temperatures for each succeeding reaction, e.g. by advancing progressively closer to a common heat source with successive reaction and heating cycles, suitably with a portion of the reforming reaction heating effected in a convention heating zone and the reaction heating completed in a radiant heating zone.

In an embodiment particularly adapted to generation of high pressure synthesis gas containing carbon oxides and hydrocarbons suitable for conversion into ammonia, the reaction mixture is passed through an initial reaction zone, an intermediate reaction zone and a final reaction zone. The reaction mixture fed to the initial reaction zone is maintained above about 750° F., and a pressure above about 700 p.s.i.g., the effluent from the initial reaction zone is heated to a temperature above about 900° F. prior to being fed to the intermediate reaction zone. The effluent from the intermediate reaction zone is heated to a temperature above 1400° F. prior to being fed to the final reaction zone. The indicated zone temperatures and inlet pressure can be varied within preferred ranges, e.g. the initial reaction zone feed temperature may be between 750 and 1000° F., and this reaction zone pressure between 750 and 1500 p.s.i.g. The final reaction zone feed temperature may be between 1450 and 1850° F. and this reaction zone pressure between 700 and 1500 p.s.i.g. The intermediate reaction zone, which may comprise several separate reactors with intervening heating stages, may have a feed at a temperature between 900 and 1400° F. and a zone pressure intermediate the initial and final reaction zones. In preferred arrangements of reaction zones and heating stages, the feed to each successive reactor is at a temperature higher than the feed to the previous reactor while the pressure in each successive reactor is lower than the next preceding reactor by an amount equal to the pressure drop through the reactor and heaters. In typical cases, the synthesis gas product generated will contain less than about 8 mol percent methane (water-free basis) and be delivered from the process at a pressure of 700 p.s.i.g. or higher.

In another aspect, the invention provides in the mentioned process for synthesis gas generation, a process including alternately heating and adiabatically reacting the reaction mixture while advancing the reaction mixture through a temperature graded heating zone progressively from the lower to the higher temperature portions of the zone, the higher temperature portions of the heating zone being heated radiantly while the lower temperature zone portions are heated by convection from the radiantly heated portion.

DESCRIPTION OF THE PREFERRED EMBODIMENTS

With reference to the drawing, an alternating arrangement of adiabatic reactors and heating coils is shown for carrying out the present process. Furnace 1 is a vertically extended structure of suitable heat resistant material having a higher temperature, radiant heating section 2 and a lower temperature, convection heating section 3. The furnace may be horizontally disposed as well. Burners 4, 4a and 5 are located in lower furnace section 2 for burning the mixture of fuel and air introduced through lines 6, 6a and 6b to the furnace. Flue gases and other products of combustion and their associated heat contents travel upwardly through the furnace 1 to the convection section 3 so that the furnace interior 7 is at progressively lower heated condition along its length. The furnace 1 terminates in a conventional stack at 8.

A mixture of steam and hydrocarbon feed vapors is fed to the furnace for heating to desired temperatures and catalytic reaction in contact with catalytically effective amount of a suitable catalyst known per se for conversion of the steam and hydrocarbon vapor into carbon oxides and hydrogen.

The steam portion of the feed comprises super-heated steam which may be obtained using the furnace heat or from some nearby process or other source. If produced using the furnace 1, superheated steam is obtained by passing boiler feed water introduced at line 9 through heater coil 10 at the cold end 11 of the furnace, additionally heat exchanging the water feed with a available hot stream from line 12 in exchanger 13 and thence passing the stream along line 14 again through the furnace, in heater coil 15 for final vaporizing and out along line 16. The saturated steam in line 16 is sent to steam drum 17, which operates at a suitable pressure e.g. 1500 p.s.i.g. as indicated, and passed from the steam drum along line 18 to superheating coil 19 in the furnace. The high pressure superheated steam is passed from the furnace heating coil 19 along line 20 at e.g. 1500 p.s.i.g. and 900° F. to first expansion turbine 21 wherein the steam is expanded and energy recovered therefrom and a portion of the steam at 800 p.s.i.g. and 700° F. is passed along line 22 through heating coil 23 which raises the steam temperature to 1000° F. in line 24 to be combined with hydrocarbon vapors entering the system through line 25, the steam in line 24 being at suitable temperature and pressure for initiating the reforming reaction.

Excess steam is passed along line 26 to second turbine expander 27 wherein its energy is recovered for use elsewhere, e.g. in operating plant compressors, and the water/steam product passed to condensation, waste or recycle along line 28.

The hydrocarbon vapors in lines 25 comprising methane, ethane, propane, butanes, pentanes, hexanes and the like up to napthas or higher hydrocarbons, or any of these, and at a temperature of about 750° F. and a pressure of 800 p.s.i.g. is mixed with the superheated (1000° F.) steam at 800 p.s.i.g. in line 24 at 29. The thus formed reaction mixture is passed to the initial reaction zone along line 30. The initial reaction zone comprises a suitable vessel 31 of any desired shape and suitable material and containing a bed 31a of reforming catalyst.

The reforming reaction in reactor 31 and all other reactors shown is endothermic and accordingly the initial reaction zone effluent, containing the reaction mixture and carbon oxides and hydrogen in some finite amount depending on specific reaction conditions, is passed from the reactor 31 along line 32 at a reduced temperature, e.g. 920° F., and a somewhat lowered pressure owing to the pressure drop across the catalyst bed 31a.

The initial reactor 31 effluent in line 32 is passed through the furnace convection section 3 in heater coil 33 which raises the effluent temperature to about 1100° F. for feeding to the intermediate reaction zone. In the illustrated embodiment, the intermediate reaction zone comprises a plurality of reactors, four of which are shown, i.e. reactors 34, 35, 36 and 37. As will be noted from the broken lines in the drawing, the number of reactors may be varied to provide as many successive reaction stages as desired or required to achieve the substantially complete exhaustion of hydrocarbon, e.g. less than 8 mol percent methane for ammonia synthesis gas and less than 2 mol percent methane for other syntheses, e.g. hydrogen, methanol and Oxo products. Typically between 3 and 8 separate reaction stages (reactors) will be used in an ammonia synthesis gas reformer according to the present process. A separate heating coil is provided in advance of each reactor. Thus heater coil 33 precedes reactor 34, heater coil 39 follows reactor 34 and precedes reactor 35, heater coil 40 follows reactor 35 and precedes reactor 36, and heater coil 41 follows reactor 36 and precedes reactor 37. It will be noted that the several reactors 34–37 as well as initial reactor 31 and final reactor 42 are arranged for series flow connection through intermediate heater coils 33, 39, 40, 41 and 43 with which they alternate and that the successive heater coils progressively approach the radiant heating section 2 of the furnace 1 where burners 4, 4a and 5 are located, i.e. they advance closer to the common heat source defined by the furnace radiant heat section. Accordingly, the several heater coils impart progressively higher temperatures to the fluids passing therethrough as the successive heater coils move downward in location within the furnace 1. Typical temperature rises through the heater coils are from 920° to 1100° F. through heater coil 33 and from 1490° F. to 1600° F. through heater coil 43 leading from intermediate reactor 37 to final reaction zone reactor 42 whence the synthesis gas emerges at typically 700 p.s.i.g. and 1530° F.

EXAMPLE I

This example illustrates adiabatic serial reactors with alternating heating coils. All reaction mixture heating is effected in the radiant heating section of the furnace. Figures are for primary reforming of naphtha for feed to a 100 ton/day ammonia plant. The power for driving the major rotating machinery is derived from the steam turbines. Reforming plant feeds are:

boiler feed water: 225,000 pounds per hour
steam to superheater: 480,000 pounds per hour
naphtha to initial reactor: 43,070 pounds per hour All these charge rates (using four mols of steam per carbon atom fed) the heats absorbed in the reformer furnace are, assuming the conventional integration into the reformer furnace of vaporizing and superheating process and motive steam and preheating air for the secondary reformer:

|  | B.t.u./hr. | Percent |
|---|---|---|
| Reforming section | 245,000,000 | 46 |
| Heat recovery section | 296,000,000 | 54 |
| Total | 541,000,000 | 100 |

TABLE I.—REFORMER MATERIAL BALANCE (IN POUNDS MOLS/HOUR)

[For 1,000 short tons ammonia per day from naphtha]

| Component | Hydrogen recycle | Naphtha plus steam, | Reformer effluent |
|---|---|---|---|
| Hydrogen | 108.8 |  | 5,788.5 |
| Nitrogen | 36.3 |  | 36.3 |
| Argon | 0.4 |  | 0.4 |
| Carbon monoxide |  |  | 1,008.4 |
| Carbon dioxide |  |  | 1,364.8 |
| Methane | 1.1 |  | 666.7 |
| Naphtha |  | 435.4 |  |
| Steam | 0.1 | 12,198.6 | 8,461.6 |
| Total | 146.7 | 12,634.0 | 17,326.7 |

The foregoing illustrative embodiment of the invention indicates that 54% of the heat absorbed is absorbed in the heat recovery or convection section, as is typical in conventional reforming reactors. This convection heat may be put to use in heating the reaction mixture as shown in Example II, below.

In general, however, since the heater coils in the reformer furnace no longer contain catalyst they are freed from the restrictions of having to serve as a heated container for solids and flowing gases under pressure. They may now be made in any diameter or configuration desired. One preferred form of furnace heating element, for example, would be a number of parallel vertical "hairpins" comprised of tubes of the commonly-used type 304, 24-20 Cr-Ni stainless steel, or similar alloy, in the heating zone of the furnace and attached to headers of the same or similar material, said headers being insulated from or placed outside of the heating zone of the furnace to reduce their metal temperature. For example, 2" OD tubing (25-20 Cr-Ni) with ¼" wall will have adequate structural integrity to meet the extreme temperature and internal pressure requirements in the heating zone of the reforming unit shown. Other tube forms, sizes, assemblies and materials may, of course, be used in the heating elements without altering the concept of the invention.

The separation of the reactor catalyst mass and of the heat-transfer elements into a plurality of discrete units gives unusual flexibility to the reformer. First, it allows greater freedom in varying the catalyst formulation as regards both particle size and shape, and chemical composition. For example, in the reforming of light hydrocarbons such as naphtha, as typified by Equation 2, it is postulated that the first action is pyrolysis or hydrocracking of the naphtha, followed by chemical reaction with steam. The last survivor of the cracking of the feedstock is held to be the most refractory hydrocarbon, methane. The catalyst employed in the initial reactor (to which is sent the preheated steam-hydrocarbon feed mixture) can be a catalyst tailored for effectively rupturing carbon-to-carbon bonds without laying down deposits of troublesome coke or carbon. Catalyst used in subsequent beds can be specifically formulated to aid the reforming reaction. Catalyst composition may also be graduated, if desired, to match the change in composition of the process gas as it flows from stage to stage in the process. The benefits from so varying the catalyst formulation from stage to stage include maximizing the activity and life of the catalysts (thus lowering their initial installation and replacement costs) as well as improved process performance by more nearly attaining equilibrium gas composition (lower methane "leak") at a given gas outlet temperature relative to a catalyst whose composition is a compromise for the average gas composition in the conventional reformer tubes.

Secondly, the flexibility in the utilization of heat in the present process reforming furnace leads to the possibility of significant fuel savings and further reduction in furnace costs. In the conventional reformer, the reforming reaction cannot be conveniently carried out other than entirely in the radiant section of the furnace. As noted before, the entire conventional reformer tube sees the burner flames and the products of combustion leave the radiant section at temperatures above 1900° F. after supplying the heat required to perform the reforming reaction. Cooling these flue gases to 500° F. or less for the sake of economical heat utilization before venting them to the atmosphere will result in the availability of a quantity of heat of about the same magnitude as that used to conduct the reforming reaction. The minimum fired duty for the conventional reformer furnace is then about double that required to satisfy the reforming reaction. Economy of operation thus requires that means must be found for utilization elsewhere in the process or plant of at least one-half of the fired duty of this conventional reformer furnace.

In the scheme depicted in the figure, however, it is possible to locate the lower temperature reheat coils, e.g. coil 33, in the convection section 3 of the furnace 1 rather than placing all the reheat coils in the radiantly heated furnace section 2. A closer approach to true countercurrency may then be achieved between the combustion gases and the vapors being reformed. The minimum fuel consumption of the furnace is no longer dictated by the total heat requirements of the reforming reaction supplied as radiant heat and can be considerably less than for the convectional reforming furnace.

EXAMPLE II

It is assumed that the first two of six reheat coils in the figure are placed in the convection section of the furnace and the remaining four reheat coils in the radiant heat section thereof, the absorbed heat in the radiant section of the furnace is reduced from 245 million B.t.u./hour (of Example I) to 174 million B.t.u./hour. If the burner fuel firing is set to give a flue gas crossover temperature of 2,200° F. between the radiant and convection sections, the flue gas temperature will be such as to provide sufficient temperature driving force to accomplish process preheating requirements for primary steam and secondary air and with over 50 million B.t.u./hour of heat still available for other purposes from the flue gas as it cools to 500° F. The overall absorbed heat of the furnace is thereby reduced from 541 million B.t.u./hour (Example I) to 360 million B.t.u./hour. This will return a very significant saving in fuel (about ⅓) and the cost of the furnace is likewise reduced. The recuperation of auxiliary heat in the Heat Recovery Section will then account for only 115 million B.t.u./hour or 32% of the fired duty, rather than 50% or more in a conventional furnace catalyst tube arrangement.

I claim:
1. In the process for generating high pressure synthesis gas containing hydrogen and carbon oxides from a reaction mixture comprising steam and hydrocarbon vapor by contacting the mixture at reaction temperature with a solid catalyst for the endothermic synthesis gas generating reaction, the steps including, in sequence,
   (1) heating the reaction mixture in a heating zone out of contact with said catalyst to reaction temperature,
   (2) at a pressure above 700 p.s.i.g. adiabatically reacting said heated reaction mixture in a reaction zone containing said catalyst and separate from the heating zone to form a synthesis gas-containing effluent,
   (3) repeating steps (1) and (2) with successive synthesis gas containing reaction zone effluents as the reaction mixture until the hydrocarbon vapor therein is substantially exhausted, and
   (4) recovering the synthesis gas thus generated.
2. Process according to claim 1 including effecting successive reaction steps in successive separate reaction zones.
3. Process according to claim 1 including effecting successive heating steps in successive separate heating zones.
4. Process according to claim 3 including heating each of said successive heating zones from a common heat source.
5. Process according to claim 4 including alternating said successive heating steps with reaction steps in separate reaction zones.
6. Process according to claim 1 including maintaining the reaction mixture entering the reaction zone above about 750° F.
7. Process according to claim 1 including heating said reaction mixture to successively higher temperatures for each successive reaction.
8. Process according to claim 7 including advancing the reaction mixture progressively closer to a common heat source to effect said successively higher temperature heating of said reaction mixture.
9. Process according to claim 1 including passing the reaction mixture through an initial reaction zone, an intermediate reaction zone and a final reaction zone and maintaining the reaction mixture fed to the initial reaction zone above about 750° F., heating the initial reaction zone effluent to a temperature above 900° F. prior to feeding this effluent to the intermediate reaction zone and heating the intermediate reaction zone effluent to a temperature above 1400° F. prior to feeding this effluent to the final reaction zone.
10. Process according to claim 1 in which said first reaction zone is maintained at a pressure between 750 and 1500 p.s.i.g. and the reaction mixture fed thereto is at a temperature between 750° F. and 1000° F. and including also maintaining said final reaction zone at a pressure between 700 and 1500 p.s.i.g. and the reaction effluent feed thereto at a temperature between 1450° F. and 1850° F.
11. Process according to claim 10 in which the intermediate reaction zone feed is at a temperature between 900 and 1400° F.
12. Process according to claim 11 in which the feed to each successive reactor is at a temperature higher than the feed temperature at the next preceding reactor while the pressure in each successive reactor is lower than the next preceding reactor.
13. Process according to claim 12 in which said synthesis gas product contains less than 8 mol percent methane on a water-free basis.
14. Process according to claim 13 including radiantly heating the higher temperature portions of the heating zone and heating the lower temperature portions of said zone by convection from the radiantly heated portion.
15. Process according to claim 14 in which at least about 25% of the total reforming reaction duty is provided in the convection section.

References Cited
UNITED STATES PATENTS

| | | | |
|---|---|---|---|
| 3,420,642 | 1/1969 | Percival | 48—214 |
| 3,459,520 | 8/1969 | Percival | 48—214 |
| 3,531,267 | 9/1970 | Gould | 48—214 X |

MORRIS O. WOLK, Primary Examiner

R. E. SERWIN, Assistant Examiner

U.S. Cl. X.R.

48—215; 252—373